United States Patent
Todd et al.

(10) Patent No.: US 9,871,851 B2
(45) Date of Patent: Jan. 16, 2018

(54) MIGRATING PRIVATE INFRASTRUCTURE SERVICES TO A CLOUD

(71) Applicant: EMC Corporation, Hopkinton, MA (US)

(72) Inventors: Stephen J. Todd, Shrewsbury, MA (US); John J. Roese, Newmarket, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 439 days.

(21) Appl. No.: 14/319,773

(22) Filed: Jun. 30, 2014

(65) Prior Publication Data

US 2015/0381435 A1 Dec. 31, 2015

(51) Int. Cl.
*H04L 29/08* (2006.01)
*G06F 9/455* (2006.01)
*G06F 9/48* (2006.01)
*G06F 9/50* (2006.01)
*H04L 12/24* (2006.01)

(52) U.S. Cl.
CPC .......... *H04L 67/10* (2013.01); *G06F 9/45558* (2013.01); *G06F 9/4856* (2013.01); *G06F 9/5072* (2013.01); *G06F 2009/4557* (2013.01); *H04L 41/5096* (2013.01)

(58) Field of Classification Search
CPC ....... H04L 41/50; H04L 67/10; G06F 9/5072; G06F 9/4856; G06F 9/45558; G06F 2009/4557
See application file for complete search history.

(56) References Cited

U.S. PATENT DOCUMENTS

| | | | | |
|---|---|---|---|---|
| 8,909,767 B2* | 12/2014 | Sunkara | ................ | G06F 9/5072 709/224 |
| 2011/0184993 A1* | 7/2011 | Chawla | ............... | G06F 9/45533 707/802 |
| 2012/0254862 A1* | 10/2012 | Dong | .................... | G06F 9/4856 718/1 |
| 2012/0331528 A1* | 12/2012 | Fu | ........................... | H04L 67/10 726/4 |
| 2013/0091285 A1* | 4/2013 | Devarakonda | ........ | G06F 9/4856 709/226 |
| 2013/0191539 A1* | 7/2013 | Sailer | ...................... | H04L 67/34 709/225 |

(Continued)

*Primary Examiner* — Joe Chacko
(74) *Attorney, Agent, or Firm* — Krishnendu Gupta; Deepika Bhayana (57) ABSTRACT

Implementations are provided herein for the migration of known infrastructure services, such as those existing on a private cloud infrastructure, to a public cloud environment, that enables private cloud operators to migrate their applications and data to a public cloud environment that meets the same trust, security, and resiliency standards currently employed in the private cloud environment. In one implementation, a private cloud can communicate an infrastructure services manifest to a public or hybrid cloud provider, which highlights the application and the data that will be moved to the public or hybrid cloud. The public or hybrid cloud can then use the infrastructure services manifest to establish an optimum virtualized environment containing the infrastructure services detailed in the infrastructure services manifest.

20 Claims, 6 Drawing Sheets

(56) References Cited

U.S. PATENT DOCUMENTS

| | | | | |
|---|---|---|---|---|
| 2013/0282798 A1* | 10/2013 | McCarthy | ........... | H04L 41/0806 709/203 |
| 2014/0137244 A1* | 5/2014 | Banerjee | ................. | G06F 21/52 726/22 |
| 2014/0373092 A1* | 12/2014 | Hussain | ................ | G06F 9/5077 726/3 |
| 2015/0363452 A1* | 12/2015 | Tu | ..................... | G06F 17/30297 707/638 |
| 2015/0381711 A1* | 12/2015 | Singh | ................. | H04L 41/0813 709/221 |

* cited by examiner

MIGRATING PRIVATE INFRASTRUCTURE SERVICES TO A CLOUD

RELATED APPLICATIONS

This Application is related to U.S. patent application Ser. No. 14/320,001 entitled "CONTENT FABRIC FOR A DISTRIBUTED FILESYSTEM", Ser. No. 14/320,069 entitled "DYNAMICALLY COMPOSED COMPUTE NODES COMPRISING DISAGGREGATED COMPONENTS", Ser. No. 14/319,889 entitled "SOFTWARE OVERLAYS FOR DISAGGREGATED COMPONENTS", Ser. No. 14/318,805 entitled "APPLICATION AND INFORMATION MOVEMENT IN A CLOUD ENVIRONMENT", Ser. No. 14/318,831 entitled "CLOUDBOOK", filed on even date herewith, which are hereby incorporated herein by reference in their entirety.

FIELD OF THE INVENTION

This invention relates generally to data storage environments, and more particularly to systems and methods for migrating private infrastructure services to a public cloud environment.

BACKGROUND OF THE INVENTION

Data storage demands continue to grow at a high rate. One area of growth that is testing information technology infrastructure is the billions of users and millions of applications supported in modern computing. As consumers and businesses alike adopt mobile devices, social platforms, cloud storage, and big data, the dynamics of how we store and protect data is changing as well. Some of these new platforms can be less trusted, less secure, and less resilient than the private cloud infrastructures operated by many enterprises. These private clouds have a set of hardened and reliable infrastructure services that make the data center trusted, secure and resilient.

However, there are benefits of storing, accessing, and utilizing data from the public cloud. For example, cost, flexibility, access to markets, and market trends all may make public clouds an attractive alternative for some storage needs and some applications. However, if consumers and businesses alike want to transition or migrate sensitive data, or data that must have a guaranteed level of resiliency, they need assurances that their needs will be met. Therefore, there exists a need to provide the same infrastructure services that make the private cloud trusted, secure, and resilient, in a public cloud environment.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

In accordance with an aspect, a virtualized services catalog component can maintain a virtualized services catalog wherein the virtualized services catalog contains a set of virtualized services and associated configuration data. A receiving component can receive an infrastructure services manifest wherein the infrastructure services manifest includes application virtualization configuration data associated with an application, a private cloud application data identifier associated with application data of the application, and a set of private cloud infrastructure services. A virtualization component can generate a virtualized operating environment based on the infrastructure services manifest wherein the virtualized operating environment incorporates a set of infrastructure services based on the set of private cloud infrastructure services and the virtualized services catalog.

In accordance with another aspect, a virtualized services catalog can be maintained wherein the virtualized services catalog contains a set of virtualized services and associated configuration data. An infrastructure services manifest can be received wherein the infrastructure services manifest includes application virtualization configuration data associated with the application, a private cloud application data identifier associated with application data of the application, and a set of private cloud infrastructure services. A virtualized operating environment can be generated in the public cloud based on the infrastructure services manifest wherein the virtualized operating environment incorporates a set of infrastructure services based on the set of private cloud infrastructure services and the virtualized services catalog.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

Implementations are provided herein for the migration of known infrastructure services, such as those existing on a private cloud infrastructure, to a public cloud environment, that enables private cloud operators to migrate their applications and data to a public cloud environment that meets the same trust, security, and resiliency standards currently employed in the private cloud environment.

In one implementation, a private cloud can communicate an infrastructure services manifest to a public or hybrid cloud provider, which highlights the application and the data that will be moved to the public or hybrid cloud. The public or hybrid cloud can then use the infrastructure services manifest to establish a virtualized environment containing the infrastructure services detailed in the infrastructure services manifest. It can be appreciated that in some implementations, the infrastructure services manifest can be created on the private cloud by a tool that scans the operating environment of the private cloud to determine a list of infrastructure services present in the private cloud environment. In another implementation, the infrastructure services manifest can be generated by a user or an administrator selecting the services they desire to be present in the public or hybrid cloud operating environment. It can be appreciated that the selection of the services can be made through an application running on the private cloud side, the public or hybrid cloud side, or on any network capable of hosting such an application.

In one implementation, the public or hybrid cloud platform can automatically inspect the infrastructure services manifest, along with a catalog of known infrastructure services, and confirm the existence of the infrastructure services contained within the manifest. In one implementation, if the catalog of known infrastructure services does not contain an infrastructure service present in the infrastructure services manifest, a user or administrator can be prompted to provide details on the unknown infrastructure service, and the catalog of known infrastructure services can be updated with the previously unknown infrastructure service.

In one implementation, the public or hybrid cloud service provider can establish an optimum operating environment based on infrastructure services manifest. For example, an amount of resources, such as hardware resources like compute, memory, storage space, network access, etc. can be selected based on the manifest. In addition, the services called for in the manifest can be spun up within the environment. The application and any associated application data can then be migrated to the operating environment created in the public or hybrid cloud based on the infrastructure services manifest. It can be appreciated that the private cloud application and data environment can experience the same or better level of application resiliency in the public or hybrid cloud service provider environment.

Descriptions of Relevant Computing Systems and Environments

Figure 1:
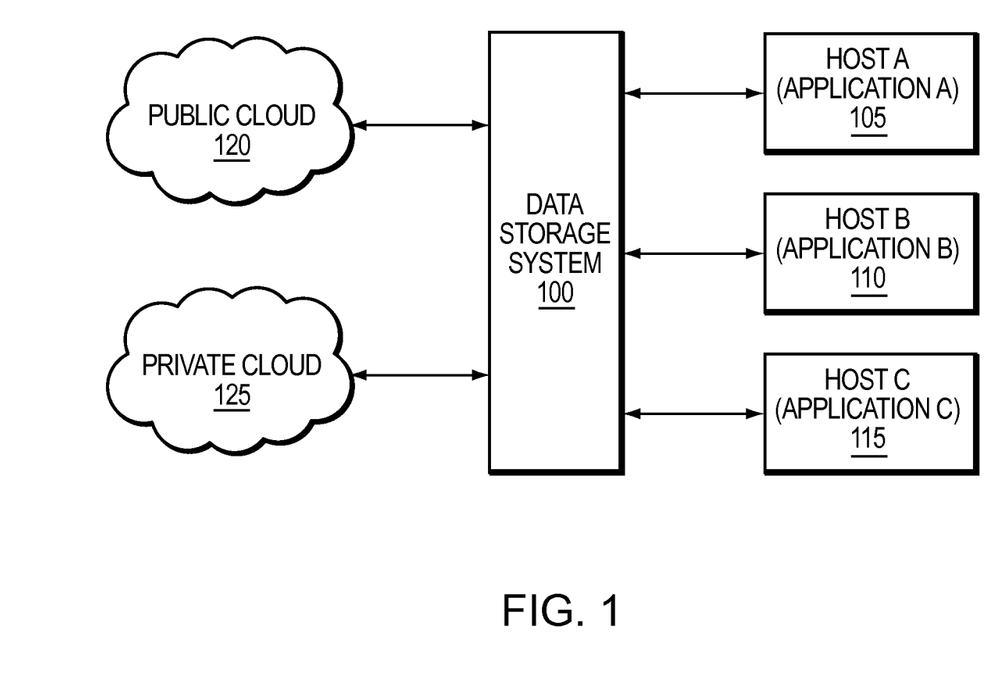
FIG. 1 illustrates an example computer system in accordance with implementations of this disclosure.

Referring now to FIG. 1, shown is an example a computer system in accordance with implementations of this disclosure. Computer systems 100 may include different resources used by one or more host processors. Resources and host processors in a computer system may be interconnected by one or more communication connections. These resources may include, for example, data storage devices such as those included in the data storage systems manufactured by EMC Corporation. These data storage systems 100 may be coupled to one or more servers or host processors 105, 110, 115 and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems 105, 110, 115 may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices or logical volumes. The logical disk units may or may not correspond to the actual physical disk drives. Allowing multiple host systems to access the single storage device unit allows the host systems to share data stored therein. In a common implementation, a Storage Area Network (SAN) is used to connect computing devices with a large number of storage devices. Management and modeling programs may be used to manage these complex computing environments.

Two components having connectivity to one another, such as a host and a data storage system, may communicate using a communication connection. In one arrangement, the data storage system and the host may reside at the same physical site or location. Techniques exist for providing a remote mirror or copy of a device of the local data storage system so that a copy of data from one or more devices of the local data storage system may be stored on a second remote data storage system. Such remote copies of data may be desired so that, in the event of a disaster or other event causing the local data storage system to be unavailable, operations may continue using the remote mirror or copy.

In another arrangement, the host may communicate with a virtualized storage pool of one or more data storage systems. In this arrangement, the host may issue a command, for example, to write to a device of the virtualized storage pool. In some existing systems, processing may be performed by a front end component of a first data storage system of the pool to further forward or direct the command to another data storage system of the pool. Such processing may be performed when the receiving first data storage system does not include the device to which the command is directed. The first data storage system may direct the command to another data storage system of the pool which includes the device. The front end component may be a host adapter of the first receiving data storage system which receives commands from the host. In such arrangements, the front end component of the first data storage system may become a bottleneck in that the front end component processes commands directed to devices of the first data storage system and, additionally, performs processing for forwarding commands to other data storage systems of the pool as just described.

Often cloud computing may be performed within or with a data storage system. As it is generally known, "cloud computing" typically refers to the use of remotely hosted resources to provide services to customers over one or more networks such as the Internet. Resources made available to customers are typically virtualized and dynamically scalable. Cloud computing services may include any specific type of application. Some cloud computing services are, for example, provided to customers through client software such as a Web browser. The software and data used to support cloud computing services are located on remote servers owned by a cloud computing service provider. Customers consuming services offered through a cloud computing platform need not own the physical infrastructure hosting the actual service, and may accordingly avoid capital expenditure on hardware systems by paying only for the service resources they use, and/or a subscription fee. From a service provider's standpoint, the sharing of computing resources across multiple customers (aka "tenants") improves resource utilization. Use of the cloud computing service model has been growing due to the increasing availability of high bandwidth communication, making it possible to obtain response times from remotely hosted cloud-based services similar to those of services that are locally hosted.

Modern data systems are becoming increasingly geographically diverse. Often referred to as "cloud computing," these data systems typically deliver services through the internet. For example, a server located in one country may be used to provide software or processing power to a client located in another country.

This internet-based infrastructure allows for several benefits, such as sharing of resources, freeing the user from Information Technology (IT) maintenance, improved utilization rates of resources, and platform-independent applications, among others.

Cloud computing infrastructures often use virtual machines to provide services to customers. A virtual machine is a completely software-based implementation of a computer system that executes programs like an actual computer system. One or more virtual machines may be used to provide a service to a given customer, with additional virtual machines being dynamically instantiated and/or allocated as customers are added and/or existing customer requirements change. Each virtual machine may represent all the components of a complete system to the program code running on it, including virtualized representations of processors, memory, networking, storage and/or BIOS (Basic Input/Output System). Virtual machines can accordingly run unmodified application processes and/or operating systems. Program code running on a given virtual machine executes using only virtual resources and abstractions dedicated to that virtual machine. As a result of such "encapsulation," a program running in one virtual machine is completely isolated from programs running on other virtual machines, even though the other virtual machines may be running on the same underlying hardware. In the context of cloud computing, customer-specific virtual machines can therefore be employed to provide secure and reliable separation of code and data used to deliver services to different customers. Data storage system 100 may either be in communication with a private cloud 125 or public cloud 120. Further, data storage system 100 may be in communication with both private cloud 125 and public clouds 120.

In a virtualized environment, a centralized management infrastructure, henceforth referred to as a virtual center, may provide a central point of control for managing, monitoring, provisioning and migrating virtual machines. A virtual machine (VM) is a software implementation of a machine that executes programs like a physical machine. Virtualization software allows multiple VMs with separate operating systems to run in isolation on the same physical server. Each VM may have its own set of virtual hardware (e.g., RAM, CPU, NIC, etc.) upon which an operating system and applications are loaded. The operating system may see a consistent, normalized set of hardware regardless of the actual physical hardware components. The virtual center may operate to control virtual machines in data centers and, for example, in connection with cloud computing. The virtual center may further include a virtual data center that provides logical control and management of data storage in a data center, and provides for sub-dividing contents of virtual components into compute resources, network resources and storage resources.

Using virtualization software, one or more physical servers may be subdivided into a plurality of virtual machines. As further discussed elsewhere herein, a virtual machine (VM) is a software implementation of a machine that executes programs like a physical machine. Virtualization software allows multiple VMs with separate operating systems to run in isolation on the same physical server. Each VM may have its own set of virtual hardware (e.g., RAM, CPU, NIC, etc.) upon which an operating system and applications are loaded. The operating system may see a consistent, normalized set of hardware regardless of the actual physical hardware components. The term "virtualization software" is used herein to generally refer to any and all software that supports the operation of one or more VMs. A number of virtualization software products exist, including the VMware product family provided by VMware, Inc. of Palo Alto, Calif. A benefit of providing VMs is the ability to host multiple, unrelated, clients in a single physical server. The virtualization software may maintain separation of each of the clients, and in which each of the clients separately access their own virtual server(s). Other virtualization products that may be used in connection with the system described herein include Hyper-V by Microsoft Corporation of Redmond, Wash., public license virtualization products and/or other appropriate virtualization software.

Configuring and deploying VMs is known in the field of computer science. For example, U.S. Pat. No. 7,577,722 to Khandekar, et al., entitled "Provisioning of Computer Systems Using Virtual Machines," which is incorporated herein by reference, discloses techniques for configuring and deploying a VM according to user specifications. VMs may be provisioned with respect to any appropriate resource, including, for example, storage resources, CPU processing resources and/or memory. Operations of VMs may include using virtual machine images. A VM image is the state of the virtual machine as it resides in the host's memory. The VM image may be obtained for an operating VM and transferred to another location where the VM continues execution from the state defined by the virtual machine image. In this way, the VM image may be a snapshot of an execution state of a program by a VM that may be moved between different locations and processing thereafter continued without interruption.

As discussed in detail elsewhere herein, in a virtualized environment, a virtual center, an example of which may be a vCenter product produced by VMware, may provide a central point of control for managing, monitoring, provisioning and migrating virtual machines. Virtual centers may operate to control virtual machines in data centers and, for example, in connection with cloud computing. A virtual center may further include a virtual data center that provides logical control and management of data storage in a data center. A virtual center may be used in connection with an infrastructure platform that provides an integrated package of components to provide network, compute and/or storage services for use in a virtualized environment. One example of an infrastructure platform is a Vblock product produced by VCE Company, LLC of Richardson, Tex. It is noted that the term "Vblock" used herein may also be generally understood as including and referring to any appropriate software and/or component packages of a converged infrastructure product that provides network, compute and/or storage services for use in a virtualized computing environment. For example, other suitable types of converged infrastructure products may include EMC Corporation's VMAX SP and/or VSPEX products. Management of a Vblock and/or other appropriate type of converged infrastructure product may be provided by an appropriate software element. For example, EMC's ASD Unified Infrastructure Manager (UIM) may be integrated with Vblock and provide a management console for management of the Vblock package.

Figure 2:
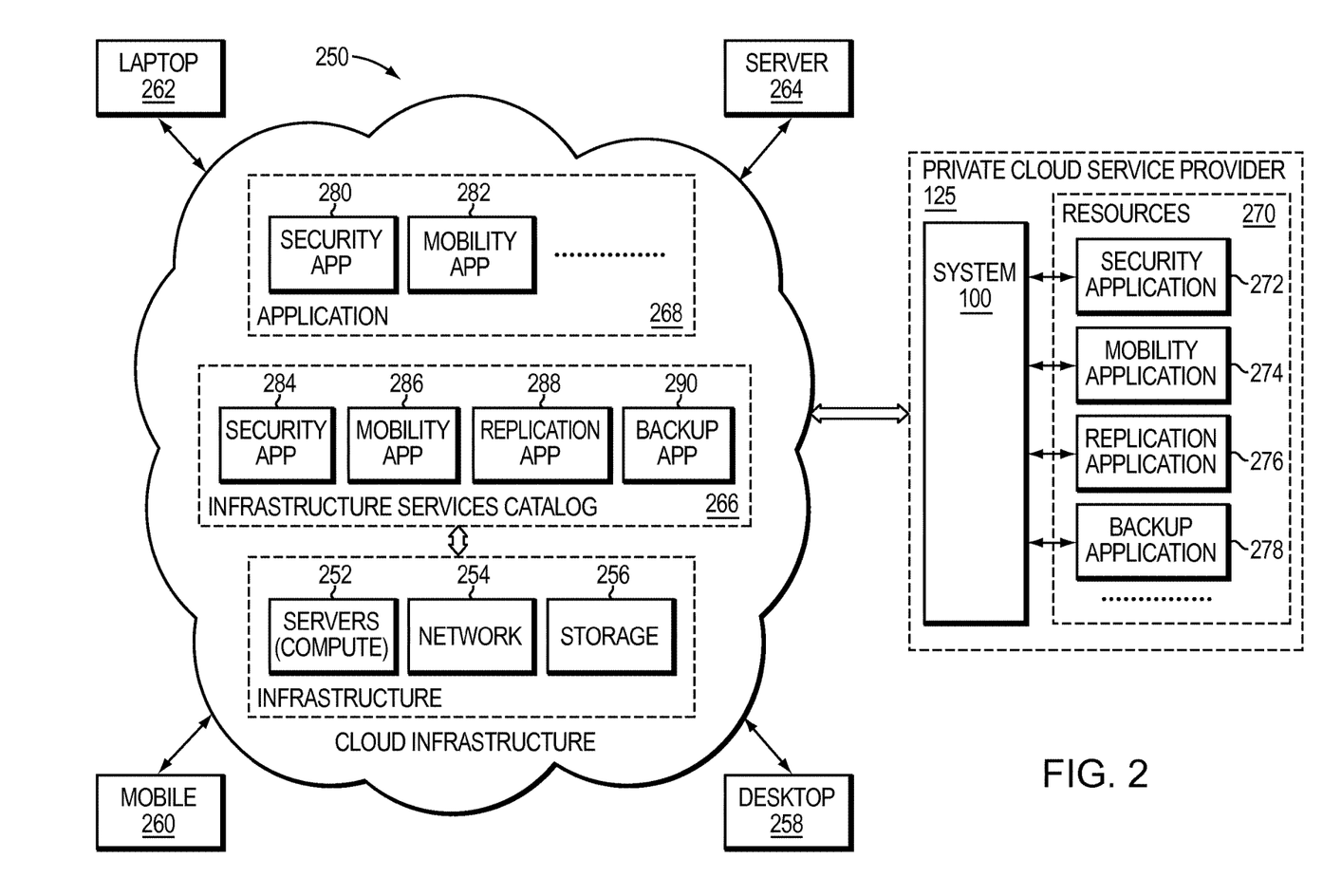
FIG. 2 illustrates another example computer system in accordance with implementations of this disclosure.

Referring to FIG. 2, shown are more detailed examples of a computer system that may be used in connection with implementations of this disclosure. FIG. 2 shows an exemplary cloud computing system 250 that may be used in connection with various embodiments of the system described herein in a manner similar to that discussed herein in connection with other types of distributed processing systems. The system 250 may include infrastructure including a compute layer 252, a network layer 254, a storage layer 256 and/or a management layer. The system 250 may be understood as providing a cloud computing environment or platform that may be used in connection with cloud storage and/or other appropriate cloud processing applications. The layers 252, 254, and 256 may be coupled together via one or more appropriate networks. In various embodiments, the compute layer 252 may include components, such as blade servers, chassis and fabric interconnects that provide the computing power for the cloud computing system. The storage layer 256 may include the storage components for the cloud computing system, such as one or more storage products produced by EMC Corporation. The network layer 254 may include one or more components that provide switching and routing between the compute and storage layers 252, 256 within systems and/or between multiple cloud computing systems and to the client or customer network.

Cloud computing system 250 can also include an infrastructure services catalog 266 also described as a virtualized services catalog in this disclosure. The infrastructure services catalog 266 can contain a set of infrastructure services 284, 286, 288, 290 capable of being implemented on the infrastructure (servers 252, network 254, and storage 256). The infrastructure services catalog 266 can also contain configuration data for infrastructure services in the catalog. For example, the configuration data can include instructions on how to implement the associated service in the cloud infrastructure environment. Continuing the example, a backup application 290 located in the infrastructure service catalog can have configuration data that describes what operating environment the backup application works under; what compute, memory and storage requirements are necessary for the backup application to function properly; instructions on how to install and activate the backup application; etc. It can be appreciated that the configuration data can include all necessary requirements, setup parameters, functional variables, etc. necessary for the application to function within the cloud infrastructure. Other types of infrastructure services that can be present in the catalog including security applications 284 such as a task for capturing network traces and gathering security logs that can be used in conjunction with analytics to offer additional functionality; data mobility applications 286 that can copy and/or move application data; and replication services 288 like snapshots, point-in-time copying, mirroring, etc. It can be appreciated that applications outside the confines of these generic categories can also be included in the infrastructure services catalog. For example, in one implementation, and as discussed in greater detail below, additions can be made to the infrastructure services catalog from a private cloud service 125 or a user of the cloud infrastructure 250. A user of the cloud infrastructure 250 may include a user with a desktop 258, mobile device 260, laptop 262, and server 264.

It can be appreciated that while the infrastructure services catalog can contain configuration data necessary for the service to function in the cloud, an infrastructure services manifest, as explained in greater detail below, can contain application specific parameters that can match the environment of the private cloud service provider, or create a different more desirable configuration. For example, for a backup application, the infrastructure services manifest can include application configuration data including what data is to be backed up; when the data is to be backed up; how often the data is to be backed up; where the data is to be backed up to; etc. It can be further appreciated that through the combination of the infrastructure services catalog, and the infrastructure services manifest, security 272, mobility 274, replication 276 and backup applications 278 currently operating on dedicated hardware resources 270 of the private cloud 125 can be migrated to function in similar manner, e.g., at least provide similar results even if some applications features or the entire application are virtualized in the public cloud. Thus, a corresponding virtualized instance (e.g., 280, 282) of each of the applications 272, 274, 276, 278 may be executed on cloud infrastructure 250. It can be appreciated that applications 272, 274, 276, 278 may be originally designed to work only inside the context of dedicated hardware resources 270; however, by virtualizing this software (e.g., 280, 282, etc.) these applications can be migrated to cloud infrastructure 250 to provide the same or similar functionality.

Implementations

Figure 3:
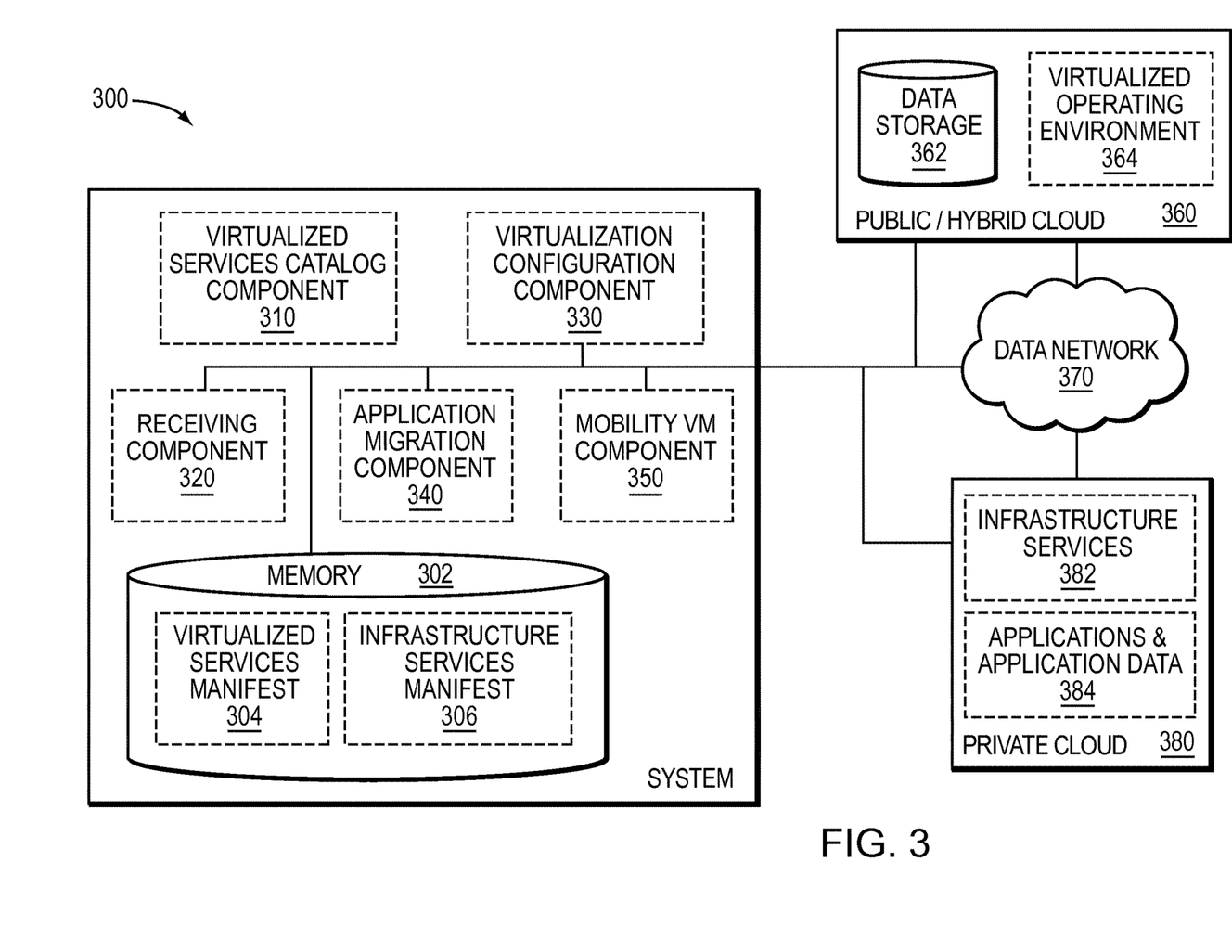
FIG. 3 illustrates an example system for migrating an operating environment to a public/hybrid cloud in accordance with implementations of this disclosure.

Referring now to FIG. 3, there is illustrated an example system 300 for migrating an operating environment to a public/hybrid cloud in accordance with implementations of this disclosure. System 300 includes virtualized services catalog component 310, receiving component 320, application migration component 340, Mobility VM Component 350, and memory 302, that can all be in communication with data network 370, public/hybrid cloud 360, and private cloud 380. It can be appreciated that in some implementations, system 300 can reside within public/hybrid cloud 360 and/or private cloud 380. A virtualized services catalog 304 and a received infrastructure services manifest 306 can be stored within memory 302 for access by other components.

Virtualized services catalog component 310 can maintain a virtualized services catalog wherein the virtualized services catalog contains a set of virtualized services and associated configuration data. The set of virtualized services can be replication services, backup services, data storage services like deduplication, access security services, access tracing services, etc. It can be appreciated that the virtualized services catalog 304 is to encompass any type of infrastructure service 382 that is operable on private cloud 380, so as to mirror the environment of the private cloud 380 on the public/hybrid cloud 360.

Receiving component 320 can receive an infrastructure services manifest wherein the infrastructure services manifest can include application virtualization configuration data associated with an application, a private cloud application data identifier associated with application data of the application, and a set of private cloud infrastructure services. Application virtualization configuration data can include a private cloud application location, operating system compatibility data, storage space requirements for the application, location of application data, application metadata, etc. It can be appreciated that application virtualization configuration data can include the parameters necessary for the application to function within a virtualized operating environment. In one implementation, receiving component 320 can receive a virtualized infrastructure service addition comprising of at least a virtualized service and associated configuration data and wherein the virtualized services catalog component adds the virtualized infrastructure service addition to the virtualized services catalog. For example, if virtualized services catalog 304 does not contain a reference to a desired infrastructure service, associated configuration data of the previously unknown service can be added to the virtualized services catalog 304.

Virtualization configuration component 330 can generate a virtualized operating environment based on the infrastructure services manifest wherein the virtualized operating environment incorporates a set of infrastructure services based on the set of private cloud infrastructure services and the virtualized services catalog.

Application migration component 340 can migrate an application to the virtualized operating environment. In one implementation, application migration component 340 migrates the application data to a data storage location 362 of the public/hybrid cloud 360 based on the private cloud application data identifier and wherein the migrated application data is accessible to the virtualized operating environment. For example, the private cloud data identifier can indicate a location of the data on private cloud 380, or in another implementation, the identifier can include instructions readable by private cloud 380 operable to return data from private cloud 380. In another example, data storage location 362 could be any data storage location communicatively coupled to public/hybrid cloud 360 capable of being accessed by the virtualized operating environment.

Mobility VM component 350 can provide the application within the virtualized operating environment dynamic access to the application data based on the private cloud application data identifier wherein the application is active prior to the application migration component completely migrating the application data. In one implementation, the application is fully functional prior to the application migration component 340 completely migrating the application data. For example, the application can be functional while interacting with application data residing on both private cloud 380 and public/hybrid cloud 360.

Figure 4:
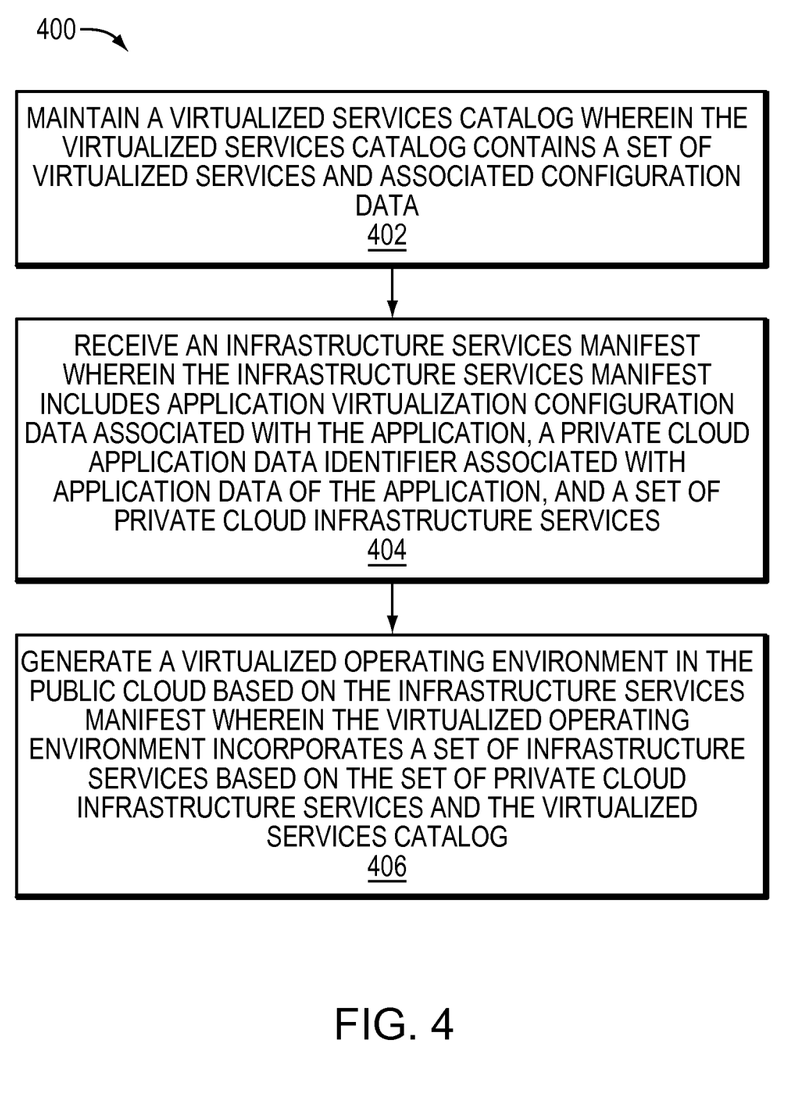
FIG. 4 illustrates an example method for migrating an operating environment in accordance with implementations of this disclosure.
Figure 5:
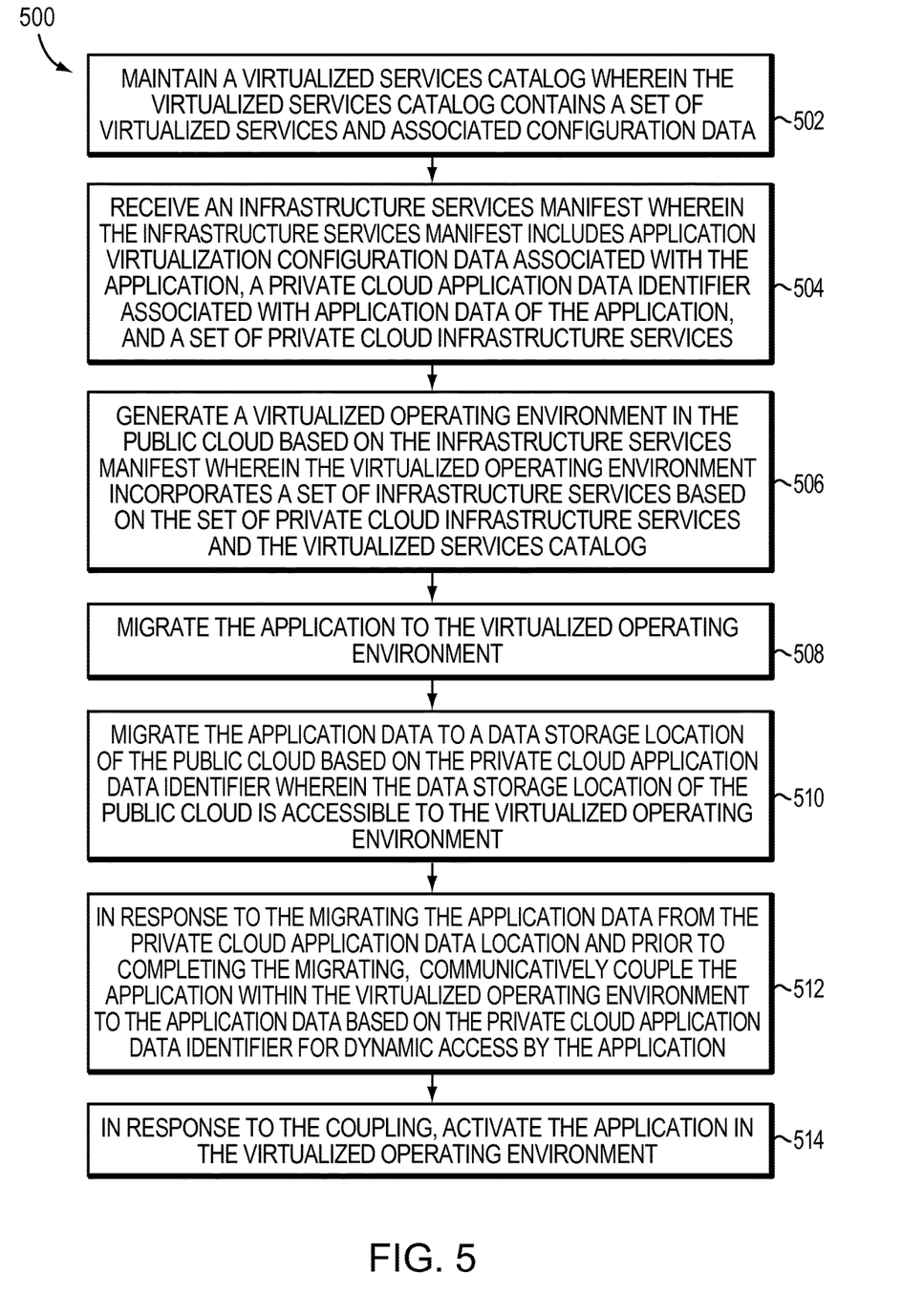
FIG. 5 illustrates an example method for migrating an operating environment including migrating application data in accordance with implementations of this disclosure.
Figure 6:
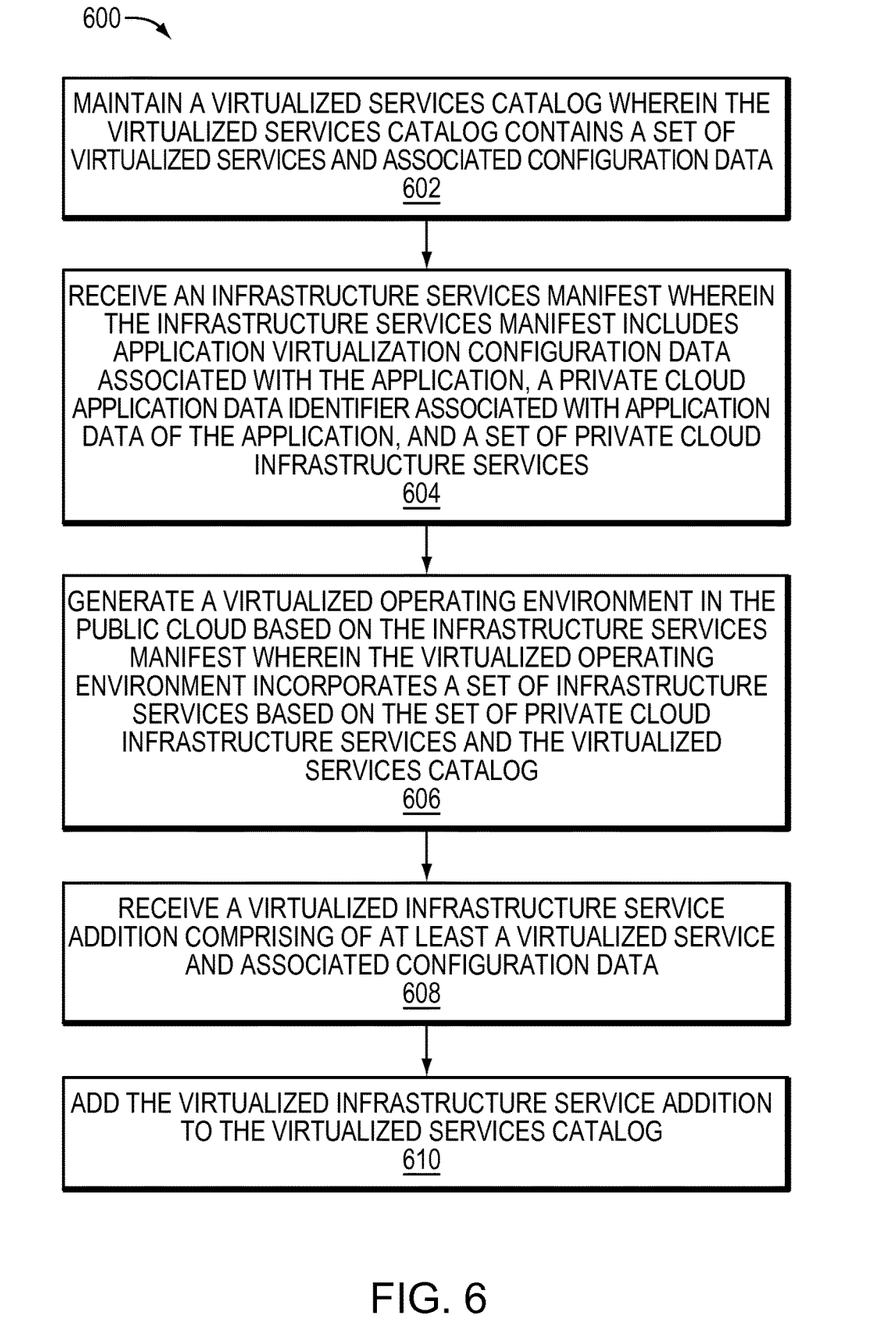
FIG. 6 illustrates an example method for migrating an operating environment including adding new infrastructure services to a catalog in accordance with implementations of this disclosure.

FIGS. 4-6 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

FIG. 4 illustrates an example method for migrating an operating environment in accordance with implementations of this disclosure. At 402, a virtualized services catalog can be maintained (e.g., by virtualized services catalog component 310), wherein the virtualized services catalog contains a set of virtualized services and associated configuration data. At 404, an infrastructure services manages can be received (e.g., by receiving component 320) wherein the infrastructure services manifest includes application virtualization configuration data associated with the application, a private cloud application data identifier associated with application data of the application, and a set of private cloud infrastructure services. At 406, a virtualized operating environment in the public cloud can be generated (e.g., by a virtualization configuration component 330) based on the infrastructure services manifest wherein the virtualized operating environment incorporates a set of infrastructure services based on the set of private cloud infrastructure services and the virtualized services catalog.

FIG. 5 illustrates an example method for migrating an operating environment including migrating application data in accordance with implementations of this disclosure. At 502, a virtualized services catalog can be maintained (e.g., by virtualized services catalog component 310), wherein the virtualized services catalog contains a set of virtualized services and associated configuration data. At 504, an infrastructure services manages can be received (e.g., by receiving component 320) wherein the infrastructure services manifest includes application virtualization configuration data associated with the application, a private cloud application data identifier associated with application data of the application, and a set of private cloud infrastructure services. At 506, a virtualized operating environment in the public cloud can be generated (e.g., by a virtualization configuration component 330) based on the infrastructure services manifest wherein the virtualized operating environment incorporates a set of infrastructure services based on the set of private cloud infrastructure services and the virtualized services catalog.

At 508, an application can be migrated (e.g., by application migration component 340) to the virtualized operating environment. At 510, the application data can be migrated (e.g., by application migration component 340) to a data storage location of the public cloud based on the private cloud application data identifier wherein the data storage location of the public cloud is accessible to the virtualized operating environment. At 512, in response to migrating the application data from the private cloud application data location and prior to completing the migrating, the application within the virtualized operating environment can be communicatively coupled (e.g., by mobility VM component 350) to the application data based on the private cloud application data identifier for dynamic access by the application. At 514, in response to the coupling, the application can be activated (e.g., by mobility VM component 350) in the virtualized operating environment.

FIG. 6 illustrates an example method for migrating an operating environment including adding new infrastructure services to a catalog in accordance with implementations of this disclosure. At 602, a virtualized services catalog can be maintained (e.g., by virtualized services catalog component 310), wherein the virtualized services catalog contains a set of virtualized services and associated configuration data. At 604, an infrastructure services manages can be received (e.g., by receiving component 320) wherein the infrastructure services manifest includes application virtualization configuration data associated with the application, a private cloud application data identifier associated with application data of the application, and a set of private cloud infrastructure services. At 606, a virtualized operating environment in the public cloud can be generated (e.g., by a virtualization configuration component 330) cloud based on the infrastructure services manifest wherein the virtualized operating environment incorporates a set of infrastructure services based on the set of private cloud infrastructure services and the virtualized services catalog.

At 608, a virtualize infrastructure service addition comprising of at least a virtualized service and associated configuration can be received (e.g., by receiving component 320). At 610, the virtualized infrastructure service addition can be added (e.g., by virtualized services catalog component 310) to the virtualized services catalog.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present disclosure. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A cloud computing system comprising:
   a memory that has stored thereon computer executable components; and
   at least one processor, that executes the following computer executable component stored in the memory:
   a virtualized services catalog component that maintains a virtualized services catalog wherein the virtualized services catalog contains a set of virtualized services capable of being implemented on an infrastructure including a server, a network and storage, and associated configuration data, wherein the associated configuration data includes information required to implement a virtualized service of the set of virtualized services in the infrastructure;
   a receiving component that receives an infrastructure services manifest wherein the infrastructure services manifest includes application virtualization configuration data associated with an application, a private cloud application data identifier associated with application data of the application, and a set of private cloud infrastructure services, wherein the application virtualization configuration data includes a set of parameters required for the application to function within a virtualized operating environment, wherein the set of parameters include an operating system compatibility data, storage space requirements for the application, location of the application data, and application metadata; and
   a virtualization configuration component that generates the virtualized operating environment based on the infrastructure services manifest wherein the virtualized operating environment incorporates a set of infrastructure services based on the set of private cloud infrastructure services and the virtualized services catalog.

2. The system of claim 1, further comprising:
   an application migration component that migrates the application to the virtualized operating environment.

3. The system of claim 2, wherein the application migration component migrates the application data to a data storage location of the cloud computing system based on the private cloud application data identifier and wherein the migrated application data is accessible to the virtualized operating environment.

4. The system of claim 3, further comprising:
   a mobility VM component that provides the application within the virtualized operating environment dynamic access to the application data based on the private cloud application data identifier wherein the application is active prior to the application migration component completely migrating the application data.

5. The system of claim 4, wherein the application is fully functional prior to the application migration component completely migrating the application data.

6. The system of claim 1, wherein the receiving component further receives a virtualized infrastructure service addition comprising of at least a virtualized service and associated configuration data and wherein the virtualized services catalog component adds the virtualized infrastructure service addition to the virtualized services catalog.

7. The system of claim 1, wherein application virtualization configuration data includes at least one of a private cloud application location, an application data size, and an application data type.

8. The system of claim 1, wherein the set of private cloud infrastructure services includes at least one of replication services, backup services, access security services, security analytics services, and access tracing services.

9. A method for migrating an application from a private cloud to a public cloud comprising:

using at least one processor to execute computer executable components stored on a non-transitory computer readable medium to perform the following acts:

maintaining a virtualized services catalog wherein the virtualized services catalog contains a set of virtualized services capable of being implemented on an infrastructure including a server, a network and storage and associated configuration data, wherein the associated configuration data includes information required to implement a virtualized service of the set of virtualized services in the infrastructure;

receiving an infrastructure services manifest wherein the infrastructure services manifest includes application virtualization configuration data associated with the application, a private cloud application data identifier associated with application data of the application, and a set of private cloud infrastructure services, wherein the application virtualization configuration data includes a set of parameters required for the application to function within a virtualized operating environment, wherein the set of parameters include an operating system compatibility data, storage space requirements for the application, location of the application data, and application metadata; and generating the virtualized operating environment in the public cloud based on the infrastructure services manifest wherein the virtualized operating environment incorporates a set of infrastructure services based on the set of private cloud infrastructure services and the virtualized services catalog.

10. The method of claim 9, further comprising:

migrating the application to the virtualized operating environment.

11. The method of claim 10, further comprising:

migrating the application data to a data storage location of the public cloud based on the private cloud application data identifier wherein the data storage location of the public cloud is accessible to the virtualized operating environment.

12. The method of claim 11, further comprising:

in response to the migrating the application data from the private cloud application data location and prior to completing the migrating, communicatively coupling the application within the virtualized operating environment to the application data based on the private cloud application data identifier for dynamic access by the application;

in response to the coupling, activating the application in the virtualized operating environment.

13. The method of claim 12, wherein activating the application includes full functionality.

14. The method of claim 9, further comprising:

receiving a virtualized infrastructure service addition comprising of at least a virtualized service and associated configuration data; and adding the virtualized infrastructure service addition to the virtualized services catalog.

15. The method of claim 9, wherein application virtualization configuration data includes at least one of a private cloud application location, an application data size, and an application data type.

16. The method of claim 9, wherein the set of private cloud infrastructure services includes at least one of replication services, backup services, access security services, security analytics services, and access tracing services.

17. A non-transitory computer-readable medium comprising computer executable components stored thereon to perform the following acts:

maintaining a virtualized services catalog wherein the virtualized services catalog contains a set of virtualized services capable of being implemented on an infrastructure including a server, a network and storage and associated configuration data, wherein the associated configuration data includes information required to implement a virtualized service of the set of virtualized services in the infrastructure;

receiving an infrastructure services manifest wherein the infrastructure services manifest includes application virtualization configuration data associated with the application, a private cloud application data identifier associated with application data of the application, and a set of private cloud infrastructure services, wherein the application virtualization configuration data includes a set of parameters required for the application to function within a virtualized operating environment, wherein the set of parameters include an operating system compatibility data, storage space requirements for the application, location of the application data, and application metadata; and generating the virtualized operating environment in the public cloud based on the infrastructure services manifest wherein the virtualized operating environment incorporates a set of infrastructure services based on the set of private cloud infrastructure services and the virtualized services catalog.

18. The non-transitory computer-readable medium of claim 17, further comprising:

migrating the application to the virtualized operating environment.

19. The non-transitory computer-readable medium of claim 18, further comprising:

migrating the application data to a data storage location of the public cloud based on the private cloud application data identifier wherein the data storage location of the public cloud is accessible to the virtualized operating environment.

20. The non-transitory computer-readable medium of claim 19, further comprising:

in response to the migrating the application data from the private cloud application data location and prior to completing the migrating, communicatively coupling the application within the virtualized operating environment to the application data based on the private cloud application data identifier for dynamic access by the application;

in response to the coupling, activating the application in the virtualized operating environment.

* * * * *